Patented Sept. 11, 1945

2,384,579

UNITED STATES PATENT OFFICE 2,384,579

IRON PIGMENTS

Vincent C. Vesce, Ridgewood, N. J., assignor to Harmon Color Works, Inc., Haledon, N. J., a corporation of New York No Drawing. Application August 20, 1941,
Serial No. 407,681

7 Claims. (Cl. 260—22)

This invention relates to iron pigments; and it comprises an iron pigmentary composition having good red and brown hues, said composition comprising ferric hydrated oxide precipitated in the presence of acetate ion at a pH around 7.5 and immediately dispersed wet in an alkyd resin, water being afterwards removed from the dispersion under azeotropic conditions until the composition is substantially free of water; all as more fully hereinafter set forth and as claimed.

It is the current impression that ferric iron reds of desirable color can be made only with an intermediate oxidation of ferrous iron; that the color of preparations made directly from ferric oxide is in all cases dull and undesirable. Dried precipitated oxide from ferric chloride and like salts gives dull hues ranging between rust and ochre.

In any pigment the color value depends quite as much on the state of subdivision as on other factors. The hues of the wet precipitate formed from ferric solutions are not unattractive, but they change in drying as the individual particles agglomerate and become coarser. The hues of ferric oxide precipitates dried in any of the ordinary ways are not good.

I have discovered that drying hydrated ferric oxide precipitates in such a way that the particles are individually dried gives good clear hues of a desirable type. The particular hue depends to a large extent on the circumstances of precipitation. Ferric oxide has vigorous adsorbing properties and it takes down with it varying quantities of any anion that may be in the solution with a corresponding change in tint. It is my discovery that good and desirable iron pigments can be made by precipitating ferric oxide from a solution containing the acetate ion, dispersing the wet precipitate in a resin and then drying; the presence of the acetate ion giving better reds than are obtained in its absence. Under the circumstances, drying is of the individual particles and they have no chance to agglomerate or coarsen.

In other words a good and desirable pigment can be made from ferric salts directly without the necessity of going through a ferrous compound. In fact, the presence of any ferrous ion tends to muddy the shade. In making pure shades it is advantageous to add a little sodium hypochlorite (NaOCl) solution in order to insure the absence of any ferrous ion. However, sometimes shades having darker tones are desirable and in such cases the presence of a little ferrous ion is permissible. In producing such darker tones a little ferrous ion may be deliberately added, say as little as 1 per cent. However, as a rule it is best to keep all the ion salt in the ferric condition.

In specific embodiments of the present invention a solution of a ferric salt is precipitated by a suitable alkali in the presence of a dissolved acetate, such as sodium acetate. Using ferric chloride, the amount of acetate may be sufficiently great to correspond to a total formation of ferric acetate. However, the proportion of acetate ion in the liquid during precipitation is not greatly important as a precipitate of ferric iron contained in the liquid carries only the amount of acetate which can be adsorbed. In the best embodiment of the present invention, the liquor is kept within narrow pH limits, namely, around 7.5 to 8.5 in forming the precipitate. The wet curd formed on precipitation is a good clear brownish red but the clarity of color disappears if it be dried in the ordinary ways.

To effect individual drying of the particles in the ferric precipitate, I have found it desirable to disperse and wet the precipitate immediately in a resin in rather large quantity; say 200 to 400 per cent on a basis of $Fe_2O_3$. Alkyd resins modified with linseed oil are desirable menstrua. After the dispersion is formed the water in the system is carefully removed, which is best done by azeotropic drying; that is, by incorporating an immiscible volatile solvent in the pasty composition and then driving off the water at low temperature. Often the alkyd resin is a commercial preparation or varnish base containing volatile solvents. Some of this solvent serves in drying and it may not be necessary to add a further quantity.

In this way after drying, dry solid solutions of colloidal ferric oxide in alkyd resins can be readily obtained and the preparation readily ground to pigmentary fineness. It is a good paint base tolerating the admixture of qualifying metallic pigments such as fine aluminum. Particularly desirable paints can be made by incorporating a small proportion of aluminum bronze into the iron pigment.

It is, however, convenient in effecting azeotropic removal of the water by admixture of volatile solvent, such as benzol, toluol, xylol and like solvents, to make a pasty paint base instead of the dry material just described, putting in other components of the base at the same time. A simplification of the whole process is to use an alkyd varnish, working the wet iron oxide precipitate into the varnish and afterwards distilling off enough of the volatile solvent to remove the water therewith.

The following specific examples illustrate several advantageous ways of practicing the invention.

*Example I.*—In this example, colloidal ferric hydrate is prepared by precipitation from an aqueous solution, containing ferric acetate and other soluble salts, prepared by mixing separately prepared solutions of ferric chloride (A), and of sodium acetate (B).

Solution A consists of 6.22 pounds of commercial ferric chloride (42° Baumé strength) liquor diluted with 6.22 pounds of water. It is free of ferrous salts and is rather acid.

Solution B is prepared by adding, to 20.4 pounds of 13.4 per cent acetic acid, a solution of 1.87 pounds of caustic soda in 16.5 pounds of water. Solution B has a pH between 6.0 and 6.5.

Solution A is gradually added to B and the mixture stirred until the reaction is complete. The resulting slightly acid solution (C) of ferric acetate has a pH of 4.0. It contains a substantial amount of sodium chloride.

Solution C is gradually added to a solution of 1.83 pounds of caustic soda in 33 pounds of water. After the ferric hydrate is precipitated, the pH of the aqueous suspension is adjusted to 7.5.

The suspension is filter pressed and the presscake washed with water until free of chlorides and other soluble salts. The washed presscake contains approximately 22 per cent of colloidal ferric hydrate (calculated as dried pigment). It is held in the pulp form for the next operation.

While this suspension of colloidal ferric hydrate is being prepared, I separately prepare an aqueous emulsion of the alkyd resin. Varnish bases comprising a commercial drying alkyd resin (linseed oil modified) dissolved in a volatile solvent, such as toluol or other aromatic solvents, in amount sufficient to give a mobile liquid containing approximately 50 per cent of non-volatiles, can be readily emulsified in aqueous liquids with the aid of triethanolamine or other suitable emulsifying agents. The alkyd resin being dissolved in a solvent, true emulsions are obtained.

*Example II.*—In preparing an alkyd resin emulsion, 0.3 pound of oleic acid is dissolved in 3.0 pounds of an alkyd resin solution as described above, and this mixture is slowly added with stirring to a solution of 0.3 pound of triethanolamine in 3.4 pounds of water. The triethanolamine oleate formed in situ serves as an emulsifying agent. Agitation produces a good uniform emulsion which can be readily admixed and blended with the wet presscake obtained in Example I, an operation illustrated in the following example:

*Example III.*—In this example, the pigment paste is prepared from the presscake and emulsion obtained in Examples I and II, respectively.

In so doing 6.8 pounds of the washed presscake are charged into a Werner-Pfleiderer mixer and there are gradually added 1.5 pounds of toluol and 9.0 pounds of an alkyd resin solution prepared as in Example II. After thorough admixing, the wet paste is ready for drying by azeotropic distillation.

In drying, the mixer is closed, vacuum applied and the mixture heated and agitated under vacuum until substantially all the water, together with some of the solvent are removed. This azeotropic distillation is continued until the mixture becomes a very dark heavy mass of pasty consistency.

This paste is useful in making paints and varnishes. It is itself an excellent colored varnish base appearing transparent and deep red in reflected light and transparent and yellow in transmitted light and can be readily converted into a variety of varnishes by adding sufficient additional solvent to obtain the desired viscosity.

For instance, an excellent varnish may be obtained as follows: Add to the paste in the mixer, 3.5 pounds of a thinner, such as toluol, Solvesso No. 2, mineral spirits etc. and further distil the thinned mixture under vacuum for 40 minutes; then add 1 pound of mineral spirit and pass once through a three-roller mill.

This varnish contains approximately 60 per cent of solids and 40 per cent volatiles; the volatiles being a mixture of aromatic petroleum solvents. The ratio of the dry resin to the ferric pigment is approximately 4:1; about 12 per cent of pigment and 48 per cent of dry resin being present in the varnish. A trace of water is also present. Analysis for water by the toluol distillation method shows less than 1 per cent of water in the composition.

The foregoing pigment-resin mixtures are merely illustrative and other pigment pastes and varnishes containing varying amounts of pigment, resin and solvent can be readily prepared by this invention. Likewise, the other details of my processes may be varied within the scope of the invention. For instance, sometimes the alkyd resin solution is directly added to the suspension of colloidal ferric hydroxide and emulsified therein, prior to filtering the aqueous suspension, as illustrated in the following example:

*Example IV.*—In this example, the aqueous suspension of colloidal ferric hydroxide is prepared as in Example I, except that the suspension after being adjusted to a pH of 7.5 to 8.0 is held as such instead of being filter pressed.

To the suspension is added an emulsion prepared by mixing 3 pounds of an alkyd resin solution (the same as that employed in Example II) with 0.3 pound oleic acid and adding slowly to a solution of 0.3 pound triethanolamine in 5 pounds water.

The emulsion and suspension are stirred together for some time. Most of the colloidal ferric hydroxide adheres to and becomes adsorbed on the emulsified globules of resin solution.

The mixture is then filterpressed and the presscake washed under pressure with water until free from soluble chlorides.

The washed presscake weights approximately 8.82 pounds and contains approximately 34 per cent of non-volatiles, of which 17 per cent is pigment and 17 per cent dry resin, the balance being solvent and water.

The wet cake is charged into a suitable mixing machine and agitated. While continuing the agitation, there are added 9.0 pounds of an alkyd resin solution (the same varnish base employed above) and 1.5 pounds of toluol. This mixture is agitated until uniform and is then subjected to distillation until substantially free of water. To the dark mass so obtained there is added 2 pounds of mineral spirits or of Solvesso No. 2, and this mixture again distilled under vacuum while continuing the agitation for another half hour to remove residual water. The resulting dry pigment paste is removed from the mixer and passed once over a three-roller mill to give a smooth uniform paste.

This paste comprises approximately 52 per cent resin, 13 per cent pigment and 35 per cent solvent; or 65 per cent non-volatile material. It is an excellent pigment paste for addition to varnishes, paints and lacquers. By thinning the paste with a mixture of aromatic and petroleum solvents, excellent varnishes can be readily obtained.

While the pigment pastes, obtained in Examples III and IV, are excellent compositions for most purposes, it is sometimes advantageous to prepare more concentrated pastes containing a higher ratio of pigment to resin. In making these concentrated pastes, smaller amounts of alkyd resin are admixed with the presscake. It is advantageous to emulsify the alkyd resin in an aqueous medium prior to admixture with the presscake. This facilitates mixing and yields other advantages. The following examples illustrate preparation of concentrated pastes.

*Example V.*—An emulsion of alkyd resin is prepared as described in Example II using 4.4 pounds of the commercial alkyd resin and varnish there described, 0.4 pound of oleic acid, 0.4 pound of triethanolamine and 4.4 pounds of water. This aqueous emulsion is admixed with 10 parts of a presscake, containing 22 per cent of hydrated ferric oxide and 78 per cent of water, obtained by the procedure of Example I.

The press cake is introduced into the mixer and the emulsion gradually added with agitation; the agitation being continued until the colloidal oxide is dispersed in the emulsion.

To this dispersion are added 4.4 pounds of an alkyd resin solution, similar to that of Example II, together with 2.2 pounds of toluol. After thorough admixing, the water is removed as described in Example III. Distillation is continued until the moisture content is less than 1 per cent, usually between 0.6 and 0.8 per cent. A deep reddish mass is obtained.

This concentrated paste contains 40 per cent volatiles and 60 per cent solids (approximately 20 per cent pigment and 40 per cent dry alkyd resin); the ratio of pigment to resin being approximately 1:2 by weight.

In Example V, after part of the aqueous emulsion of resin is added, a partial "flushing" or "shedding" of water occurs. At this point the pigment has been absorbed in the resinous phase of emulsion. The free water may be separated and removed, if desired. However, it is not necessary to do so, for the free water is again reabsorbed as the remainder of the aqueous emulsion is added and admixed; the mixture usually becoming a homogeneous paste by the time all the resin has been incorporated. If not, the water will be re-absorbed during the subsequent incorporation of the additional alkyd resin solution, together with the toluol. In fact, this is one of the advantages of adding alkyd resin solution to the mixture; such addition insuring reabsorption of any free water and the production of a uniform homogeneous paste which can be readily processed by azeotropic distillation.

Similar considerations apply to Example III wherein the mixture also shows a tendency to "flush out" and wherein additional alkyd resin solution is also added. The subsequent addition of alkyd resin solution in such processes is advantageous for the same reasons. In order to produce a smooth colloidal preparation, it is necessary to gradually transfer the resin and pigment from the aqueous to the non-aqueous phase and this is accomplished by the procedures described in Examples III and V.

These processes, wherein a homogeneous emulsion or wet paste is prepared and the water subsequently removed by azeotropic distillation, are quite different from the ordinary so-called "flushing" operations.

In certain other embodiments of my invention, the admixing of the presscake and aqueous emulsion of resin is so effected as to eliminate partial "flushing" or "shedding" of water. Very uniform homogeneous pastes are obtained. In doing so, the presscake is gradually added to and incorporated in an aqueous emulsion of alkyd resin. These methods are especially advantageous in preparing concentrated pigment pastes. They give an extremely even wetting and dispersion of the pigment. The following example is illustrative:

*Example V.*—A batch of 4.44 pounds of a 50 per cent solution of alkyd resin in mineral spirits of Solvesso No. 3 is added to a solution of 0.44 pound triethanolamine in 4.40 pounds water, and the mixture agitated until a creamy white emulsion is obtained.

This emulsion is charged into a Werner-Pfleiderer mixer. While agitating, there are gradually added 10 pounds of presscake containing about 22 per cent of hydrated ferric oxide and 78 per cent of water and prepared as set forth in Example I. Agitation is continued until a uniform homogeneous mixture, containing all of the ingredients in the state of emulsion in the water, is obtained, as a rather thick, heavy mass. An even dispersion of the pigment, without aggregation of the colloidal particles therewith, is obtained.

While continuing agitation, there are added to the emulsion 4.40 pounds of the alkyd resin solution mentioned above, together with 2.20 pounds of toluol. Agitation is continued until a smooth wet paste is obtained.

The wet paste is dried by azeotropic distillation under vacuum. In doing so, the mixer is closed (agitation being continued) and a substantial vacuum applied. Under 28 inches of vacuum, the distillation is effected at temperatures between 40° and 60° C. Most of the water and some of the solvent is distilled off. After most of the water has been removed distillation is stopped, the mixer opened and more solvent added. The thinned mixture is again distilled under vacuum as before, until a dark heavy paste substantially free of water is obtained. The dried paste is then run over a three-roller mill and is ready for packaging or use.

The concentrated pigment paste so produced contains the hydrated ferric oxide in an extremely fine state of subdivision. The particles are so small and evenly dispersed that a microscopic examination is used in grading the pastes and controlling the processes. As a matter of fact the pigment particles are so small and transparent that they can hardly be seen even using high power magnification. This is but one measure of the excellency of the pigment paste. The paste has high tinctorial power and gives pure red to brown hues. Even after extended storage, the paste exhibits good length, freedom from any thixotropic tendencies and freedom from any signs of livering.

In all embodiments of the invention an important feature is the bringing together of colloidal hydrated ferric oxide, and an (emulsified) alkyd resin, in aqueous media. Then by azeotropic removal of water solutions of colloidal ferric hydroxide or hydrated ferric oxide in the alkyd resin varnish base are readily obtained.

In the azeotropic distillation, the presence of a volatile water-immiscible solvent is important. Various solvents of this type may be employed, such as benzol, toluol, xylol and like coal tar or aromatic volatile solvents; also mineral spirits, or petroleum thinners of the hydrogenated type having aromatic properties, such as the Solvesso solvents or thinners. All such volatile solvents or thinners are widely used in making paints and varnishes. As stated, such solvents can be advantageously combined with the alkyd resin prior to admixing the resin with the wet presscake.

In short words, the present processes can be applied to any of the commercial resinous varnish bases, and in particular to varnish bases or solutions of alkyd resins heretofore employed in making varnishes, lacquers and the like.

Alkyd resin solutions previously used as grinding vehicles in dispersing pigments and making pigment pastes are especially advantageous in the practice of the present invention, as shown herein, as they can be readily emulsified in aqueous media.

The alkyd resin emulsions may be prepared in various ways, using various emulsifying agents. In lieu of the oleic acid employed in the above examples, I may use other acids capable of forming soaps useful as emulsifying agents. Sometimes naphthenic acids are employed. In lieu of triethanolamine and like phenylamines, other alkaline bases may be employed. Various amines such as ethylamines, morpholine etc. or alkali metal hydroxides, such as sodium hydroxide, may be employed, to form soaps in situ as the emulsifying agent. Or, soaps can be incorporated as such organic bases or amines, such as triethanolamine etc. may be used along as the emulsifying agent. Emulsifying agents of the types exemplified by the Duponols, Gardenols, and other commercial emulsifying agents, are useful. In general any emulsifying agents, compatible with the alkyd resin and the hydrated ferric oxide, may be used. As little agent should be employed, as is necessary to produce an emulsion containing the alkyd resin as fine dispersed particles, advantageously of colloidal order. With such emulsions both the resin and the hydrated ferric oxide particles can be retained in the water phase for a long period and gradually transferred to the non-aqueous phase during the distillation.

Further, as stated, the volatile solvent used in the azeotropic distillation can also be subsequently added, for instance, incorporated in the aqueous mixture in the mixer. Any of the volatile solvents or thinners mentioned above may be used in thinning the mixtures.

As stated, any of the various alkyd resins and solutions of such resins in volatile, water-immiscible solvents may be employed in the practice of this invention. Methods of preparing such alkyd resins and the solutions thereof, as varnish bases, grinding vehicles, varnish vehicles, etc. are well known. In general alkyd resins comprise certain types of polyhydric alcohol-polybasic acid resins and include the so-called modified polyhydric alcohol-polybasic acid resins or resinous condensation products obtained by reacting one or more polyhydric alcohols and one or more polybasic acids with one or more modifying agents, such as drying and semi-drying oils, synthetic drying oils, the fatty acids of such oils, and other monobasic acids, etc. to produce complex resins. One well-known resin comprises the condensation products of glycerol and phthalic anhydride with linseed oil acids. The solutions are usually prepared by heating a mixture of the resin producing ingredients, other than solvents, at temperatures above the melting point of the resin, until esterification and resinification are effected, cooling the resins so obtained and cutting or thinning with volatile solvents. Obviously, the properties of the resin can be modified as desired by a suitable variation in the ingredients and in the conditions of preparation.

By the present invention I can produce a wide range and variety of pigment pastes, varnishes, paints, coatings and the like, containing colloidal ferric oxide evenly dispersed in a resinous vehicle. These compositions have good red to brown hues.

Iron reds, like other pigments are generally used in a varnish vehicle of some sort and the described method of making individually dried particles of ferric oxide, using a varnish vehicle is convenient. The alkyd resins can be dispersed in water making possible a convenient method of mixing with wet oxide. But where a dry ferric oxide pigment of good hue, with or without other dry pigments is desired to be used with a subsequently added varnish vehicle, as in paint grinding, the process of my prior Patent 2,138,048 is convenient. A thin slurry of a ferric oxide presscake in water is introduced beneath the surface of agitated boiling hydrocarbon, such as toluol, and the water of the slurry is evaporated under azeotropic conditions without giving time for the individual particles of ferric oxide to clump and form coarse aggregates. Fine grinding of the material recovered from the toluene bath is not necessary. Any toners or additional pigments can be incorporated in the slurry before drying. Use of a toner is convenient in getting fiery red pigments.

In all cases, in using this method of drying, the precipitate should be fresh; it should be used before "ageing" has an opportunity to take place. Aged precipitates are invariably coarser than the fresh.

For the incorporation into pyroxylin or nitrocellulose lacquers castor oil or other non-drying vehicles may be used together with my new improved pigment preparation. With non-drying oils such as castor oil, mineral oils and even with tricresyl phosphate which is a good plasticizer for nitrocellulose coatings, the mixture of emulsified oil and pigment may also be dried under atmospheric conditions in ordinary pans and ovens. But azeotropic distillation gives better control of color and a more even dispersion of the final product.

What I claim is:

1. A method of preparing a substantially non-livering iron oxide pigment preparation which is transparent in the form of a thin layer, comprising mixing a wet colloidally subdivided precipitate of ferric hydroxide with an aqueous emulsion of an alkyd resin dissolved in a water-immiscible volatile organic solvent to form a colloidal dispersion, and subjecting the resulting dispersion to azeotropic distillation to remove substantially all the water, and to transfer gradually the pigment and the alkyd resin from the aqueous to the non-aqueous phase.

2. A method of preparing a substantially non-livering iron oxide pigment preparation comprising mixing a wet colloidally subdivided precipitate of ferric hydroxide with an aqueous emulsion of an alkyd resin dissolved in a water-immiscible volatile organic solvent to form a colloidal dispersion, subjecting the resulting dispersion to azeotropic distillation to remove substantially all the water, and to transfer gradually the pigment and said alkyd resin from the aqueous to the non-aqueous phase, and incorporating into the resulting transparent iron oxide pigment preparation a small amount of toner.

3. A method according to claim 2 wherein the aqueous emulsion is formed with the assistance of triethanolamine oleate.

4. A highly tinctorial substantially non-livering iron oxide pigment preparation free from opacity, comprising a colloidally subdivided substantially aggregate free iron oxide pigment colloidally dispersed in an alkyd resin, said preparation in the form of a thin layer of concentrated paste appearing deep rich brownish red in reflected light and yellowish in transmitted light, and exhibiting polychromatic character when applied as a relatively thin layer to a lustrous metallic surface, said preparation having been prepared in accordance with the method set forth in claim 1.

5. A highly tinctorial substantially non-livering iron oxide pigment preparation comprising a colloidally subdivided substantially aggregate free iron oxide pigment colloidally dispersed in an alkyd resin, and a small amount of toner, said preparation exhibiting polychromatic character when applied as a relatively thin layer to a lustrous metallic surface, said preparation having been prepared in accordance with the method set forth in claim 2.

6. A highly tinctorial substantially non-livering iron oxide pigment preparation comprising a colloidally subdivided substantially aggregate free iron oxide pigment colloidally dispersed in an alkyd resin and a small amount of aluminum bronze as a toner, said preparation exhibiting polychromatic character when applied as a relatively thin layer to a lustrous metallic surface, said preparation having been prepared in accordance with the method set forth in claim 2.

7. A highly tinctorial substantially non-livering pigment preparation, free from opacity, comprising a colloidally subdivided substantially aggregate free iron oxide pigment colloidally dispersed in a transparent alkyd resin of the linseed oil modified glyceryl phthalate type, said preparation in the form of a thin layer of concentrated paste appearing deep rich brownish red in reflected light and yellowish in transmitted light and exhibiting polychromatic character when applied as a relatively thin layer to a lustrous metallic surface, said preparation having been prepared in accordance with the method set forth in claim 1.

VINCENT C. VESCE.